(12) United States Patent
Sadri et al.

(10) Patent No.: US 9,378,214 B2
(45) Date of Patent: *Jun. 28, 2016

(54) METHOD AND SYSTEM FOR HASH KEY MEMORY REDUCTION

(71) Applicant: HGST TECHNOLOGIES SANTA ANA, INC., Santa Ana, CA (US)

(72) Inventors: Mohammad Reza Sadri, Irvine, CA (US); Saied Kazemi, Mountain View, CA (US); Siddharth Choudhuri, Irvine, CA (US)

(73) Assignee: HGST Technologies Santa Ana, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,635

(22) Filed: Aug. 31, 2015

(65) Prior Publication Data

US 2015/0370822 A1    Dec. 24, 2015

Related U.S. Application Data

(63) Continuation of application No. 14/456,581, filed on Aug. 11, 2014, now Pat. No. 9,122,620, which is a continuation of application No. 13/677,791, filed on Nov. 15, 2012, now Pat. No. 8,806,174.

(60) Provisional application No. 61/576,666, filed on Dec. 16, 2011.

(51) Int. Cl.
| | |
|---|---|
| *G06F 12/00* | (2006.01) |
| *G06F 17/30* | (2006.01) |
| *G06F 12/08* | (2016.01) |
| *G06F 12/10* | (2016.01) |
| *G06F 3/06* | (2006.01) |

(52) U.S. Cl.
CPC ........ *G06F 17/30132* (2013.01); *G06F 3/0626* (2013.01); *G06F 3/0643* (2013.01); *G06F 3/0673* (2013.01); *G06F 12/0864* (2013.01); *G06F 12/1018* (2013.01); *G06F 17/30371* (2013.01); *G06F 17/30949* (2013.01); *G06F 2212/6032* (2013.04); *G06F 2212/657* (2013.01)

(58) Field of Classification Search
CPC .................................................. G06F 12/0864
USPC ......................................................... 711/128
See application file for complete search history.

(56) References Cited

U.S. PATENT DOCUMENTS

| | | | | |
|---|---|---|---|---|
| 6,185,570 | B1 * | 2/2001 | Ladwig | G06F 17/30958 |
| 6,748,520 | B1 * | 6/2004 | Maynard | H03M 7/30 341/51 |
| 7,984,028 | B2 * | 7/2011 | Laursen | G06F 17/3033 707/698 |
| 8,806,174 | B2 | 8/2014 | Sadri et al. | |
| 2006/0095588 | A1 * | 5/2006 | Van Lunteren | H04L 45/7457 709/246 |
| 2009/0094435 | A1 * | 4/2009 | Lu | G06F 12/0862 711/216 |
| 2012/0155469 | A1 * | 6/2012 | Majumdar | H04L 45/26 370/392 |
| 2014/0223029 | A1 | 8/2014 | Bhaskar et al. | |

* cited by examiner

*Primary Examiner* — Prasith Thammavong
(74) *Attorney, Agent, or Firm* — Wilmer Cutler Pickering Hale and Dorr LLP

(57) ABSTRACT

A system and method are disclosed for storing data in a hash table. The method includes receiving data, determining a location identifier for the data wherein the location identifier identifies a location in the hash table for storing the data and the location identifier is derived from the data, compressing the data by extracting the location identifier; and storing the compressed data in the identified location of the hash table.

20 Claims, 7 Drawing Sheets

METHOD AND SYSTEM FOR HASH KEY MEMORY REDUCTION

CROSS-REFERENCE TO RELATED APPLICATIONS

This application is a continuation of U.S. patent application Ser. No. 14/456,581, filed Aug. 11, 2014, which is a continuation of U.S. patent application Ser. No. 13/677,791, filed on Nov. 15, 2012, now U.S. Pat. No. 8,806,174, issued Aug. 12, 2014, which claims priority under 35 U.S.C. §119(e) to U.S. Provisional Patent Application No. 61/576,666, filed Dec. 16, 2011, each of which is expressly incorporated herein by reference in its entirety, each of which is expressly incorporated herein by reference in its entirety.

FIELD OF THE DISCLOSURE

The present disclosure relates to methods and systems for reducing storage requirements for data stored in hash tables.

BACKGROUND

Memory devices are often used to store data provided by a computer program. Examples of memory storage devices include, but are not limited to, solid-state drives, hard disk drives, and optical drives. These types of storage devices are inexpensive and hold large amounts of data. However, one tradeoff for their economic value is that they are slow compared to other components used in a computer. For example, a consumer hard drive can store terabytes of data cheaply, but has a maximum theoretical transfer rate of 300 megabytes (MB) per second. Random access memory (RAM) is faster in performance but higher in price, with a maximum theoretical transfer rate of 12.8 gigabytes (GB) per second. A central processing unit (CPU) with specialized memory known as level 1 (L1) cache or level 2 (L2) cache has even better performance but at an even higher price, with a transfer rate of 16 GB per second, or over fifty times faster than the storage device.

Because computer components exhibit this tradeoff between price and performance, a technique known as caching may be used to increase, or accelerate, overall system performance. Caching may be used to store data requested from one slower component, into another faster component, to speed future requests for the same data. The data stored in a cache often may be values previously requested by a software application, by an operating system, or by another hardware component. Caching organizes a small amount of fast-access memory and a large amount of slow-access memory. The first time that a value is requested, the data is not in the cache, so the requested value is retrieved from the slow-access memory. In a cache, when the value is retrieved from the slow-access memory, the value is sent to the component that requested it, and the value also is stored in the fast-access memory for future requests. The next time that the same value is requested by the operating system or by any other program, the value is retrieved from the fast-access memory, with the result that the overall system performance is faster, or accelerated, by virtue of the value being available from the fast-access memory. By using faster memory components to cache data, the more requests that can be served from the cache instead of the slower storage device, and the faster the overall system performance.

A cache can be considered a type of hash table. A hash table refers to a computer data structure which stores a plurality of data in a collection, such as an array, using a numerical index. A hash function determines a numerical index, or location in the hash table to store the data, as a function of the input data to be stored. A cache is a type of hash table because a memory controller accepts, as input, data to be stored, and stores the data to a location in the cache according to an index determined based on the input data. Typically the data to be stored in a hash table or in a cache is referred to as a key. The key can include an original memory address or index of the contents, and the contents stored at that address, when caching contents of memory such as volatile RAM or persistent storage.

SUMMARY

In one aspect, the present disclosure provides a method for storing data in a hash table, the method including receiving data, determining a location identifier for the data wherein the location identifier identifies a location in the hash table for storing the data and the location identifier is derived from the data, compressing the data by extracting the location identifier, and storing the compressed data in the identified location of the hash table. In some embodiments, the location identifier includes a set number. In some embodiments, the hash table includes a cache. In some embodiments, the hash table includes a set-associative cache.

In some embodiments, determining the location identifier for the data includes determining a number of bits to extract from the data, based on (i) a block size of the hash table and (ii) a total number of sets in the hash table, extracting a plurality of middle bits from the data, based on the number of bits to extract, calculating a decimal value of the plurality of middle bits, if the decimal value is greater than the total number of sets, determining the set number by subtracting the total number of sets from the decimal value, and setting a wrapped bit to 1, otherwise, determining the set number as the decimal value, and setting the wrapped bit to 0.

In one aspect, the present disclosure also provides a method for retrieving data from a hash table, the method including receiving an index, retrieving compressed data stored at the index of the hash table, determining a set number based on the index and an associativity, the associativity indicating the capacity of the hash set, determining whether wrapping is required, if wrapping is required, expanding the compressed data based on the set number and a total number of sets in the hash table, and otherwise, expanding the compressed data based on the set number. In some embodiments, the hash table includes a cache. In some embodiments, the hash table includes a set-associative cache.

In one aspect, the present disclosure also provides a storage device for storing data in a hash table, the storage device including a host interface for communicating with a host device, a memory for storing data, a memory controller including logic stored in a computer readable medium, the logic configured to receive data, determine a location identifier for the data, wherein the location identifier identifies a location in the hash table for storing the data and the location identifier is derived from the data, compress the data by extracting the location identifier, and store the compressed data in the identified location of the hash table. In some embodiments, the location identifier includes a set number.

In some embodiments, the logic configured to determine the location identifier for the data includes logic configured to determine a number of bits to extract from the data, based on (i) a block size of the hash table and (ii) a total number of sets in the hash table, extract a plurality of middle bits from the data, based on the number of bits to extract, calculate a decimal value of the plurality of middle bits, if the decimal value is greater than the total number of sets, determine the set number by subtracting the total number of sets from the decimal value, and set a wrapped bit to 1, otherwise, determine the set number as the decimal value, and set the wrapped bit to 0. In some embodiments, the hash table includes a cache. In some embodiments, the hash table includes a set-associative cache.

In some embodiments, the memory controller further includes logic for retrieving data from the hash table, the logic configured to receive an index, retrieve compressed data stored at the index of the hash table, determine a set number based on the index and an associativity, the associativity indicating the capacity of the hash set, determine whether wrapping is required, if wrapping is required, expand the compressed data based on the set number and a total number of sets in the hash table, and otherwise, expand the compressed data based on the set number.

In one aspect, the present disclosure also provides a non-transitory computer program product, tangibly embodied in a computer-readable medium, the computer program product including instructions operable to cause a data processing apparatus to receive data; determine a location identifier for the data, wherein the location identifier identifies a location in the hash table for storing the data, and the location identifier is derived from the data; compress the data by extracting the location identifier; and store the compressed data in the identified location of the hash table. In some embodiments, the location identifier includes a set number.

In some embodiments, the instructions operable to cause a data processing apparatus to determine the location identifier for the data further include instructions operable to cause a data processing apparatus to determine a number of bits to extract from the data, based on (i) a block size of the hash table and (ii) a total number of sets in the hash table; extract a plurality of middle bits from the data, based on the number of bits to extract; calculate a decimal value of the plurality of middle bits; if the decimal value is greater than the total number of sets, determine the set number by subtracting the total number of sets from the decimal value, and set a wrapped bit to 1; otherwise, determine the set number as the decimal value, and set the wrapped bit to 0. In some embodiments, the hash table includes a cache. In some embodiments, the hash table includes a set-associative cache.

In some embodiments, the computer program product further includes instructions operable to cause a data processing apparatus to retrieve data from the hash table, the instructions operable to cause a data processing apparatus to receive an index; retrieve compressed data stored at the index of the hash table; determine a set number based on the index and an associativity, the associativity indicating a capacity of the hash set; determine whether wrapping is required; if wrapping is required, expand the compressed data based on the set number and a total number of sets in the hash table; and otherwise, expand the compressed data based on the set number.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DESCRIPTION

The present disclosure provides a method and system for saving space in a cache memory by indexing data stored in the cache memory based on characteristics of the data to be stored. For example, data stored in a set associative cache is stored in a particular set within the set associative cache. The set is chosen based on some intrinsic quality of the data, for example, the set is selected based on a value of a subset of the data. The subset of the data corresponding to the selected set number does not need be stored in the cache. This is because the present system inherently possesses that additional information, the set number, without having to store it. Accordingly, the present disclosure provides a mechanism through which data is stored in a hash table such as a set associative cache in a compressed format.

In some embodiments, the present system and method compress the data as follows. The disclosed system and method determine a set number which will store compressed data in the hash table. The present system and method extract bits that identify the set number from the data, prior to storing the data in the hash table. This compression reduces the memory footprint of the hash set.

After storing the compressed data in the hash table, the present system and method support decompressing or expanding the data upon request. When retrieving data from the hash table, the present system and method expand the compressed data to its original value by determining bits to insert into the compressed data based on the set number which stores the compressed data in the hash table. An advantage of the disclosed method is a reduction in the amount of memory required to store the data in the hash table.

Figure 1:
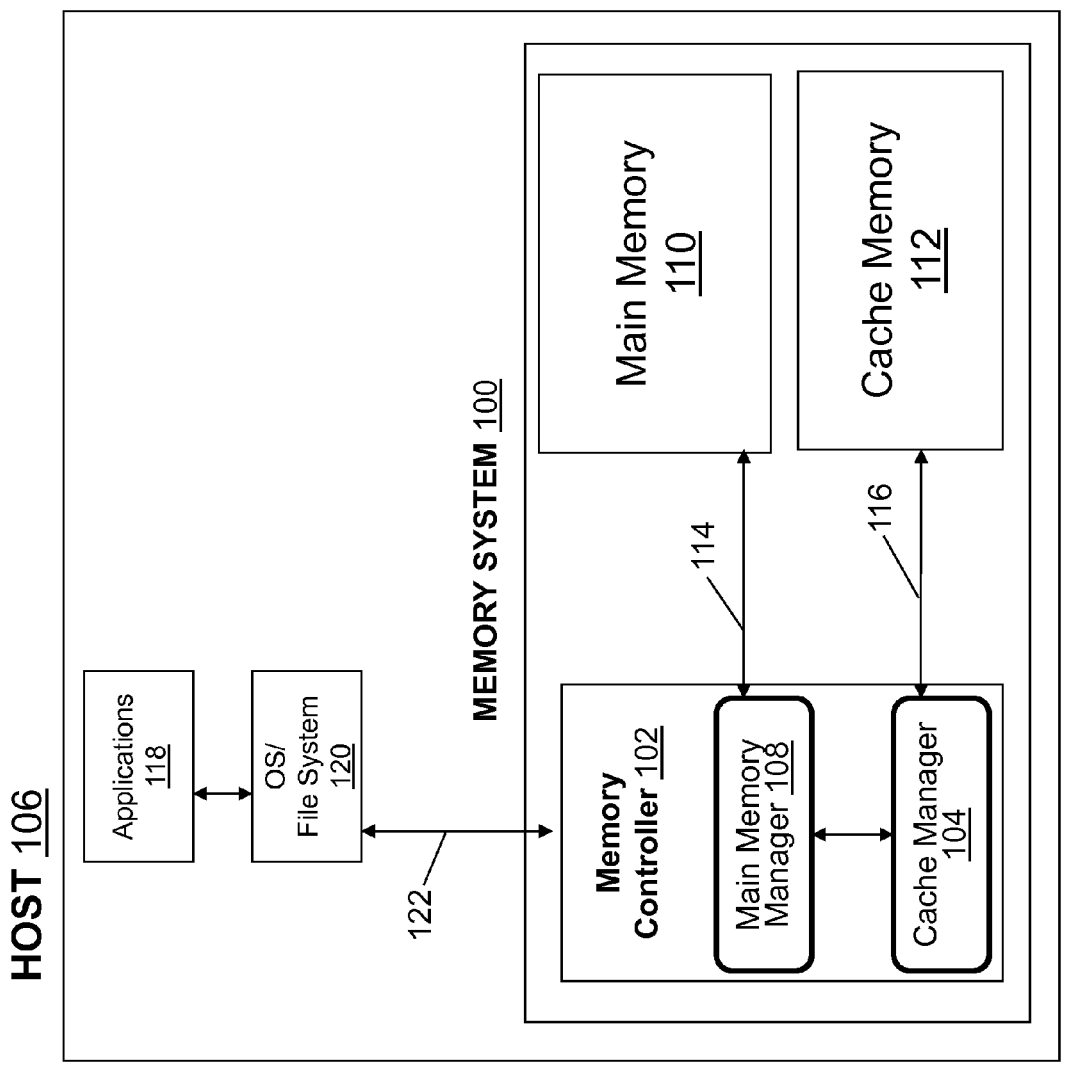
FIG. 1 illustrates main hardware components of a memory system in accordance with some embodiments of the present disclosure.

FIG. 1 illustrates main hardware components of a memory system in accordance with some embodiments of the present disclosure. The memory system includes a host 106 with a memory system 100. Memory system 100 can include a memory controller 102, a main memory 110, and a cache memory 112. Memory controller 102 can include a cache manager 104 and a main memory manager 108. Cache manager 104 communicates with cache memory 112 over a cache memory interface 114, and main memory manager 108 communicates with main memory 110 over a main memory interface 116.

Host 106 runs applications 118 on an operating system (OS) and file system 120. Applications 118 and OS and file system 120 communicate with memory controller 102 to read and write data using a memory interface 122. If data requested by host 106 is not in the cache, memory controller 102 can pass a read request for data to main memory manager 108. Main memory manager 108 can read and write data to main memory 110. Main memory 110 can be permanent storage such as a hard drive or a solid state device, or temporary storage such as a random access memory (RAM) or a read-only memory (ROM).

To accelerate future requests for the same data, memory controller 102 also can use cache manager 104 to read and write data to a hash table. The hash table can be a cache memory such as cache memory 112. Main memory 110 can store a larger amount of data but with slower access times, and cache memory 112 can store a smaller amount of data but with faster access times. Accordingly, cache memory 112 can contain copies of contents and main memory addresses to speed access to requested data. For example, memory controller 102 may receive a fetch request for the contents of a memory address. Instead of fetching the contents of the requested address from the slower main memory 110, the memory controller can request the contents from the faster cache memory 112. Accordingly, memory controller 102 is able to provide the requested contents from the faster cache memory 112 rather than from the slower main memory 110.

Figure 2:
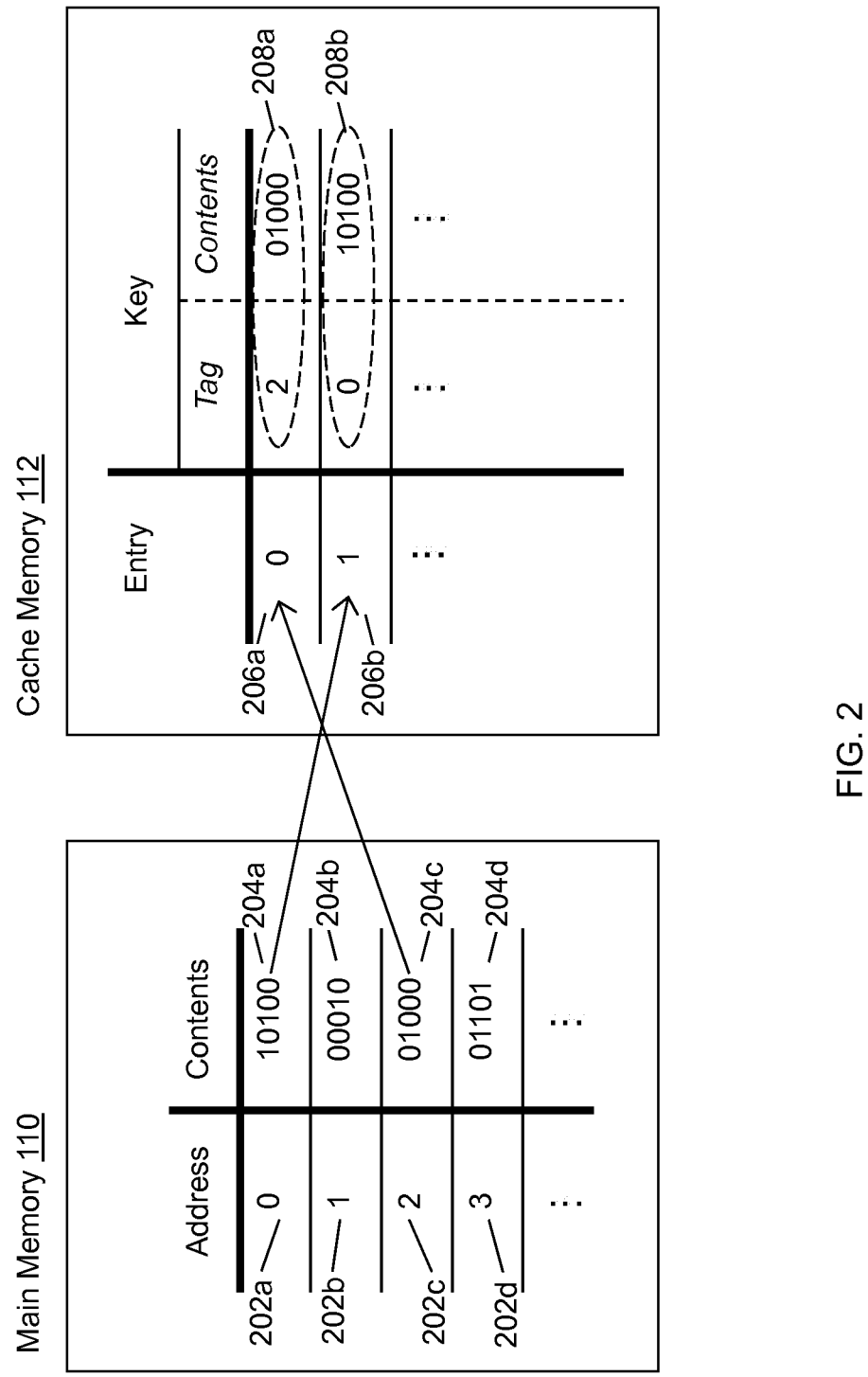
FIG. 2 illustrates a cache memory system in accordance with some embodiments of the present disclosure.

FIG. 2 illustrates a cache memory system in accordance with some embodiments of the present disclosure. The cache memory system can include main memory 110 and cache memory 112. Main memory 110 stores contents 204a-d referenced by memory addresses 202a-d. Cache memory 112 stores keys 208a, 208b referenced by indices 206a, 206b. Specifically, main memory 110 stores contents 10100 (204a) at memory address 0 (202a). Memory addresses 202a-202d are also referred to as indices or tags. Cache memory 112 stores entries in an index. For example, if the memory controller requests from main memory 110 the contents of memory address 0 (202a), the result is bits 10100 (204a). If the memory controller requests from cache memory 112 the entry at index 0 (206a), the result is key 208a consisting of tag 2 and bits 01000.

As described earlier, after the memory controller receives a read or write request for data stored in main memory 110, the memory controller also may store a temporary copy of the requested data in cache memory 112. Because the cache is smaller than main memory 110, only a part of the main memory addresses can be cached at a time. Accordingly, generally each cache entry conceptually has two parts, a tag field and a contents field. The tag field stores the original memory address in main memory. The contents field stores the original contents at the memory address in main memory. When memory address 0 (202a) and contents 10100 (204a) are stored in cache memory 112 at index 1 (206b), the combined entry to be stored is referred to as a key. The memory controller determines that index 1 (206b) of cache memory 112 should store key 208b, based on the value of key 208b. Cache memory 112 stores the original memory address for the data in main memory as a field referred to as a tag in entry 208b. The present system is able to verify the associated address later when the host requests the contents of the original memory address from the cache. Although FIG. 2 illustrates four entries in main memory 110 and two entries in cache memory 112, the present system can store any number of entries in main memory 110 and cache memory 112 up to the storage capacity of the respective memory.

When the memory controller receives a future read or write request for the same memory address, cache memory 112 is able to speed access to the stored contents by retrieving the requested contents from the smaller but faster cache memory 112. For example, the memory controller may receive a fetch request for the contents of memory address 0 (202a). Instead of fetching the contents of the requested address from the slower main memory 110, the memory controller can request the contents from the faster cache memory 112. As described in further detail later, cache memory 112 can store the contents of any memory address in any cache entry. In some embodiments, the memory controller can use a hash function to map the requested memory address to a cache entry. For example, memory address 0 (202a) may map to cache index 1 (206b). Accordingly, when requested by the memory controller, cache memory 112 returns the entry stored at index 1 (206b), which is key 208b. Because any cache entry is capable of storing the contents of any memory address, the memory controller compares the tag component of the retrieved key 208b with the requested memory address, to verify that it has retrieved the correct contents. Because the tag component of key 208b, tag 0, matches the requested memory address 0 (202a), the memory controller is able to confirm that contents 10100 from cache memory 112 correspond to the requested memory address.

Keys are stored in cache memory 112 as binary data, similar to other computer data. FIG. 2 shows keys 208a, 208b with separate tag and contents portions for illustrative purposes. In practice, because keys are stored in binary form, an example key may be 1010100, where the most significant bits 10 represent tag 2 in binary, and the least significant bits 10100 represent contents 10100. The disclosed system and method also manipulate this example key as a decimal number. Because the binary representation of this example key is 1010100, the corresponding decimal representation of the key is $84=1\times2^6+0\times2^5+1\times2^4+0\times2^3+1\times2^2+0\times2^1+0\times2^0$.

Figure 3:
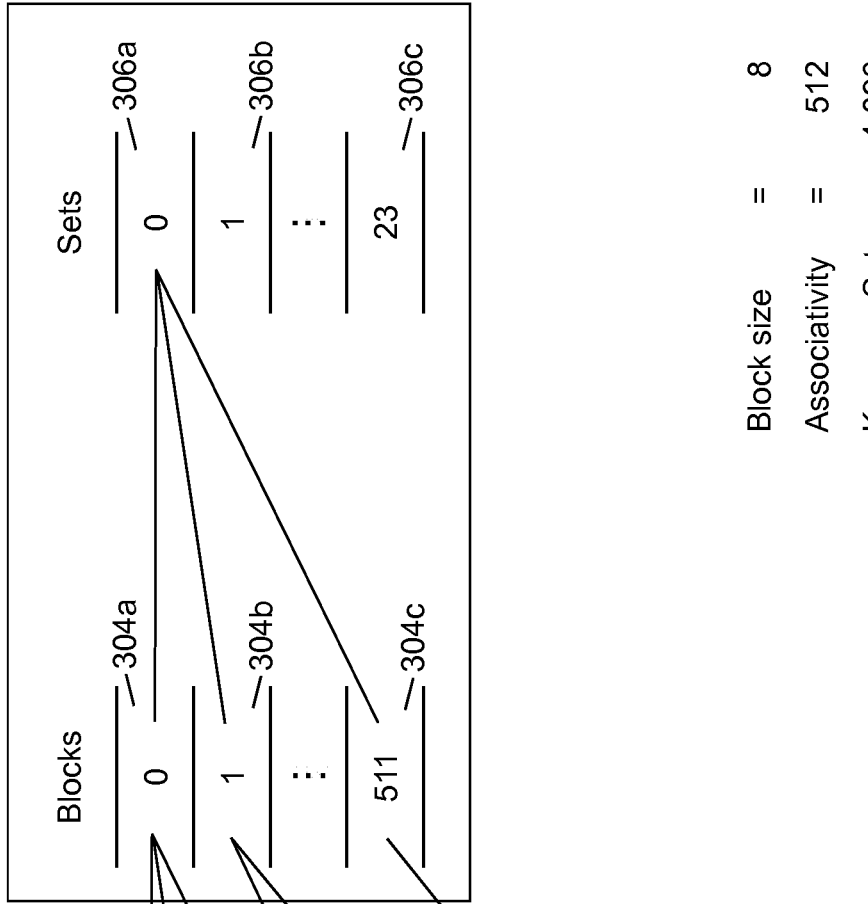
FIG. 3 illustrates a set associative cache memory configuration in accordance with some embodiments of the present disclosure.
Figure 3:
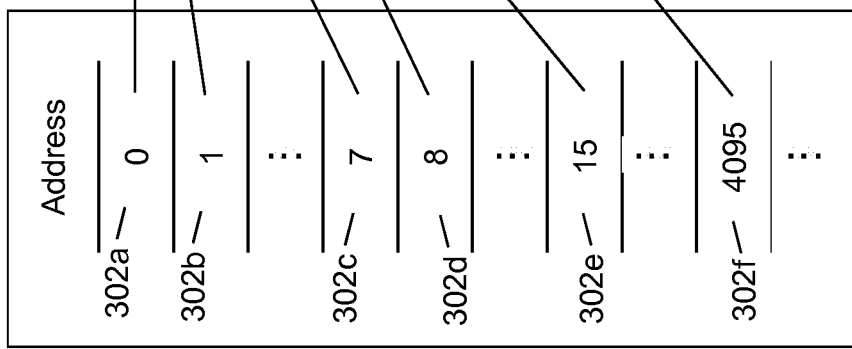

FIG. 3 illustrates a set associative cache memory configuration in accordance with some embodiments of the present disclosure. FIG. 3 includes main memory 110 and cache memory 112. Main memory 110 includes memory addresses 302a-f. Cache memory 112 includes cache blocks 304a-c and cache sets 306a-c.

In some embodiments, cache memory 112 logically groups keys into blocks. Instead of caching a single piece of data, cache memory 112 can cache multiple pieces of data in a block. A typical number of keys contained by a key block is a power of two (e.g., $2=2^1$, $8=2^3$, $128=2^7$). Cache memory 112 can store any key in a key block in the same cache entry, commonly referred to as a cache block. For example, if the block size is 8, keys 0 (302a) through 7 (302c) go to one cache block (304a), keys 8 (302d) through 15 (302e) go to another cache block (304b), etc.

The memory controller further logically divides cache memory 112 into sets (306a-c). Each set has a fixed number of cache blocks, referred to as associativity. Associativity also is typically specified as a power of two. For example, each cache set in a 512-way set associative cache can contain 512 cache blocks. Other non-limiting examples of set associative caches can include 2-way, 4-way, 8-way, or 256-way set associative caches, which contain two, four, eight, or 256 blocks in each set.

In some embodiments the present system supports a total number of cache sets which is not constrained to be a power of two. Instead, the total number of cache sets can be any number limited only by the size of the cache. Accordingly, while each cache set in a 512-way set associative cache can contain 512 cache blocks, the total number of cache sets is unrelated and may be larger or smaller. As illustrated in FIG. 3, for example, for a 512-way set associative cache implemented using a 200 gigabyte (GB) solid state device, the total number of cache sets may be 102,400, where each cache set can contain 512 cache blocks.

In a simple case without requiring additional storage for metadata, the total number of sets can be calculated as follows. The total cache size is the total number of sets times the size of each set (bytes per set). That is, num_sets× set_size=cache_size. To determine the number of sets, rearranging the equation yields num_sets=cache_size/set_size. In a 200 GB solid state device, the cache size is 214,748,364, 800 bytes (=200 gigabytes×1024 megabytes per gigabyte× 1024 kilobytes per megabyte×1024 bytes per kilobyte). The set size is calculated as the block size times the associativity. If the block size is 4 KB and the associativity is 512, the set size is 4,096 bytes per block×512 blocks per set=2,097,152 bytes per set. Accordingly, the number of sets is 214,748,364, 800 bytes/2,097,152 bytes per set=102,400 sets. If metadata storage is required, the calculation can be modified to account for the metadata size per block, as follows: num_sets× set_size≠cache_size (200 GB). Instead, cache_size> (num_sets×set_size)+(num_blocks+metadata bytes per block)+(superblock and alignment)=cache_size (200 GB). A superblock refers to a segment of metadata for describing the file system on a block storage device such as a flash memory. Because storage or alignment needs for metadata can use space on a flash memory array that could otherwise be used to store keys, storage requirements for metadata needs can be subtracted from the total storage otherwise available for keys.

As illustrated in FIG. 3, a cache block size of 8 and a cache associativity of 512 yields a cache set of 4,096 keys=8×512. As described earlier, one advantage of the disclosed system is that the cache can have any number of cache sets, based on the overall size of the cache. When the cache is initially set up, for example via software or firmware configuration, the number of sets is computed by dividing the cache size by the product of block size and associativity. For example, if the cache has 100,000 entries, it will have 24 cache sets of 4,096 keys that make up 98,304 entries (24×4,096=98,304). In this situation, the last 1,696 entries in the cache are unused.

Figure 4:
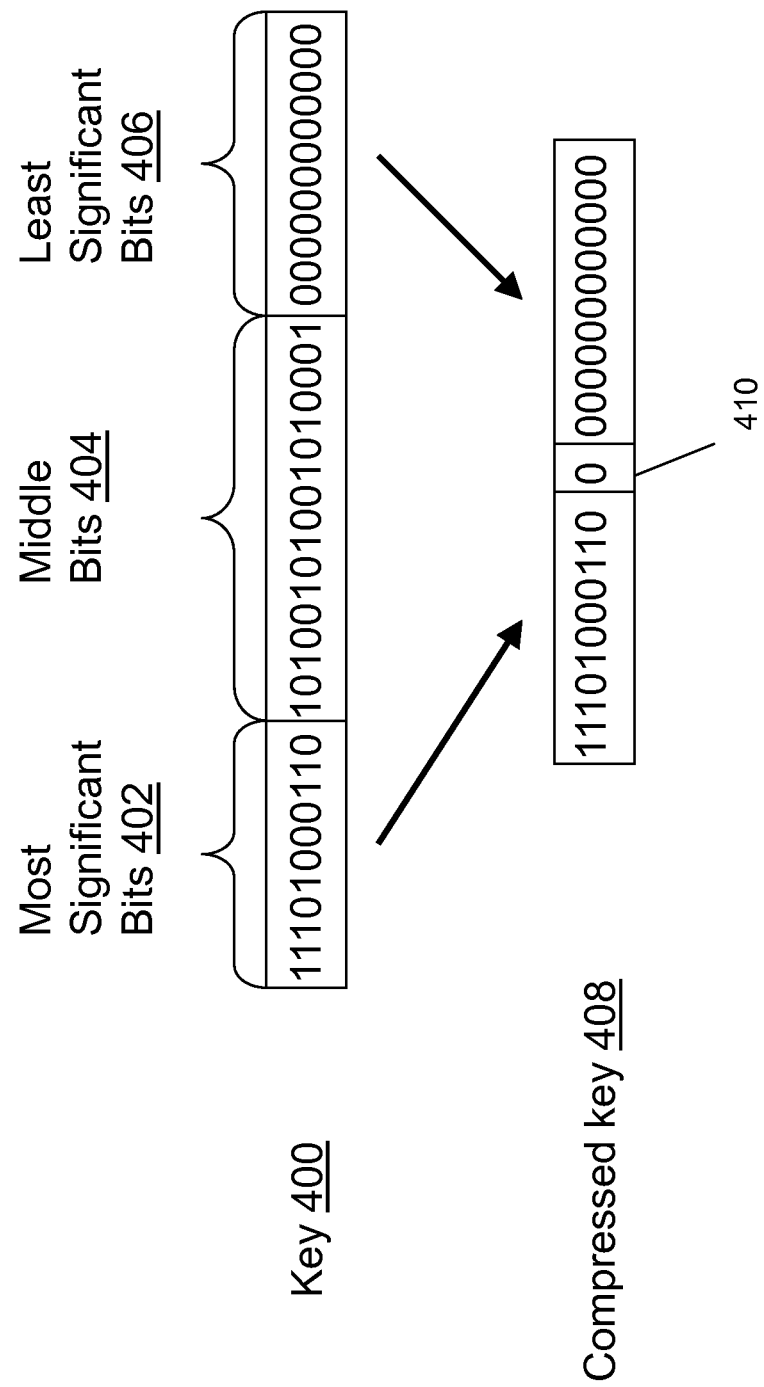
FIG. 4 illustrates a key for storage in a cache in accordance with some embodiments of the present disclosure.

FIG. 4 illustrates key 400 for storage in a cache in accordance with some embodiments of the present disclosure. The disclosed system and method compress key 400 into compressed key 408. Key 400 can represent an original memory address of contents to be stored in a cache memory. According to a storage mechanism of a set associative cache of the present disclosure, each key is made up of three groups of bits: (1) Least Significant Bits 402: bits that make up the block size, (2) Middle Bits 404: bits that determine the cache set the key belongs to, and (3) Most Significant Bits 406: bits that span the space of all valid keys. The disclosed system and method compress key 400 into compressed key 408 by extracting middle bits 404 that identify the set number, and replacing middle bits 404 with wrapped bit 410 indicating whether wrapping was required. Wrapped bit 410 helps account for caches with a total number of sets for storage capacity which is not a power of two. Wrapped bit 410 will be described in further detail later in connection with FIG. 6.

Figure 5:
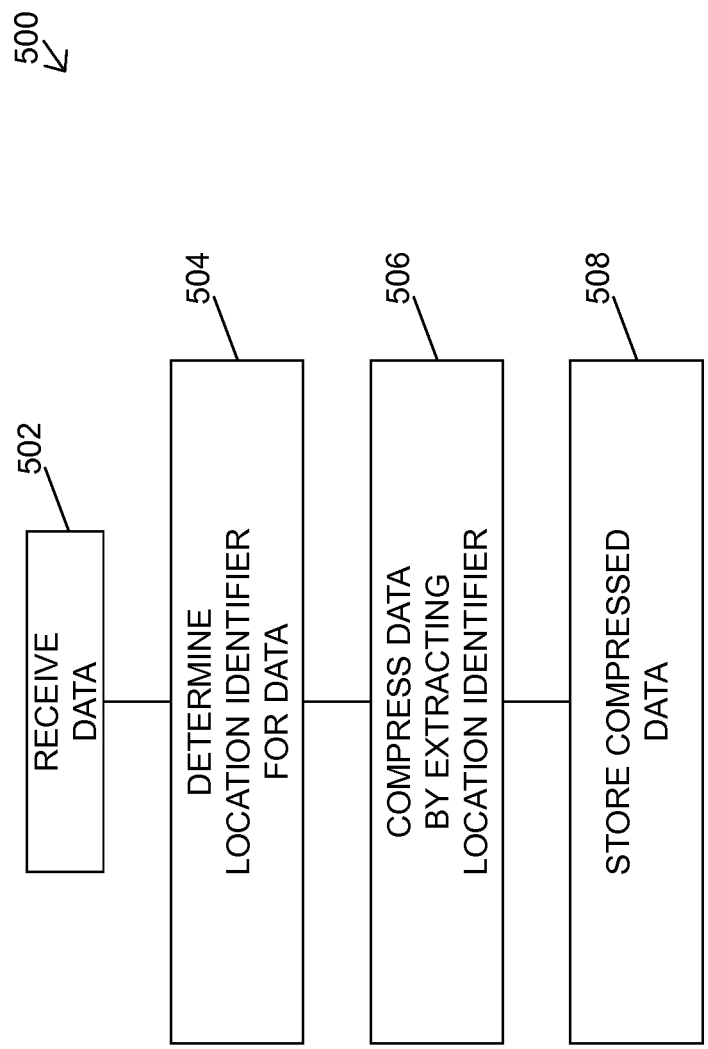
FIG. 5 illustrates a high level flow chart of a method for storing data in a cache in accordance with some embodiments of the present disclosure.

FIG. 5 illustrates a high level flow chart of a method 500 for storing data in a cache in accordance with some embodiments of the present disclosure. The memory controller receives data to be stored in a cache (step 502). In some embodiments, the data can be a key which includes a memory address in the main memory, and the contents to be stored at the memory address. The memory controller determines a location identifier for the data (step 504). In some embodiments, the location identifier can be a set number which will be associated with the location for the data in the cache. The set number represents the cache set into which the key will be stored. Step 504 is described in further detail later in connection with FIG. 6. In some embodiments, the set number corresponds to the middle bits of the key. Next, the memory controller compresses the data by extracting the set number from the key (step 506). This compression reduces the cache memory storage requirements for the data. This compression avoids losing information because the information stored is based the set number. Instead of storing the entire original input data in the associated cache set, the disclosed method stores the compressed key (step 508). Because the compressed key does not have the set number, the compressed key requires fewer bits of storage in the cache memory. The memory savings according to the disclosed system and method are proportional to the number of bits required to represent the set number.

Figure 6:
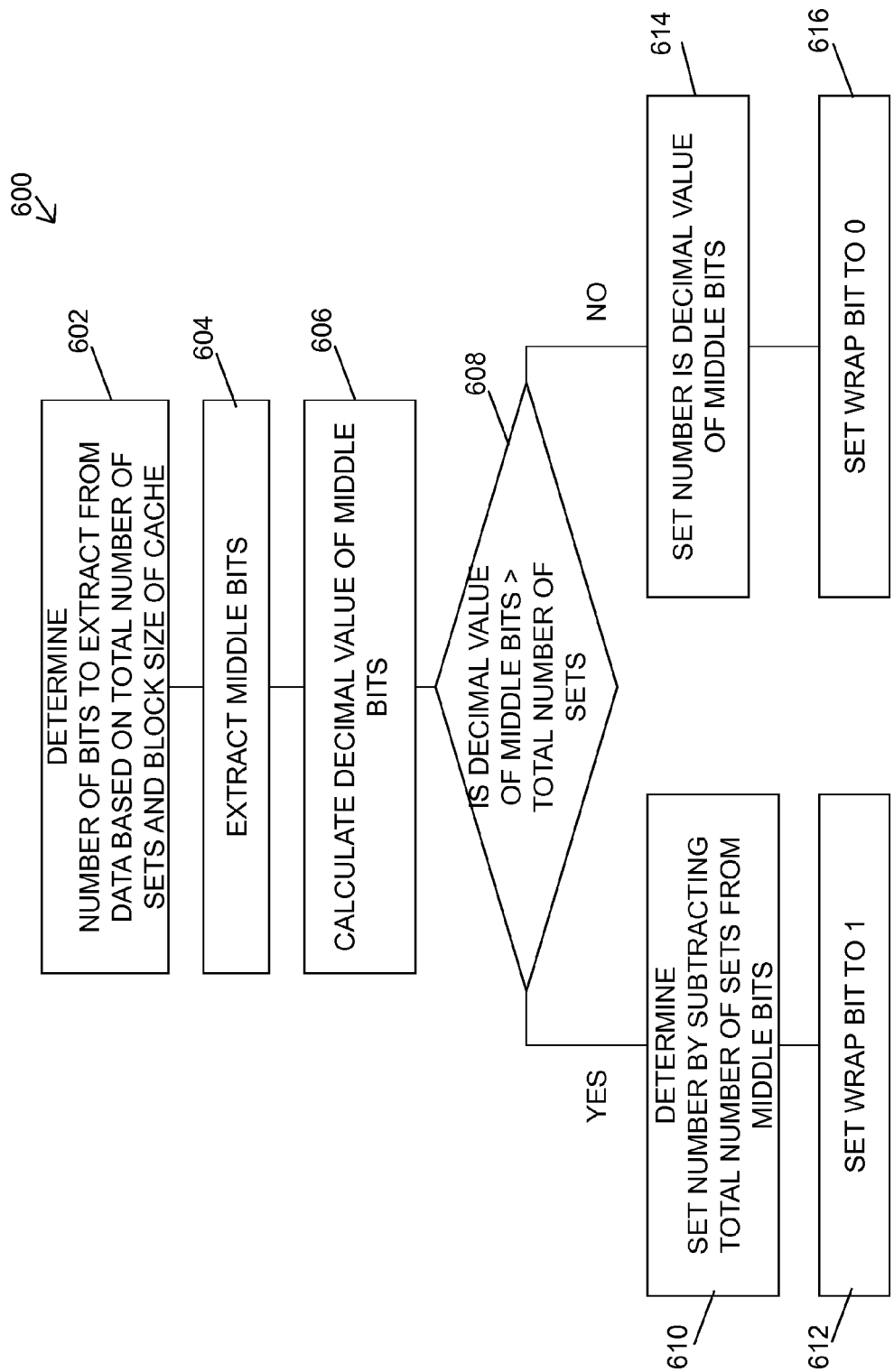
FIG. 6 illustrates a high level flow chart of a method for determining a set number for data in a cache in accordance with some embodiments of the present disclosure.

FIG. 6 illustrates a high level flow chart of a method 600 for determining a set number for data in a cache in accordance with some embodiments of the present disclosure. The memory controller determines a number of bits to extract from the key, based on the total number of cache sets and the block size of the cache (step 602). In some embodiments, the memory controller determines the number of bits to extract by calculating an intermediate value representing the most significant bits and the middle bits. The memory controller will use the intermediate value to extract the middle bits. In some embodiments, intermediate_value=key/block_size. That is, the memory controller divides the input key by the total number of keys per set, to arrive at a decimal value of the most significant bits and the middle bits.

Using the binary representation of the intermediate value, the memory controller extracts the middle bits from the intermediate value (step 604). These middle bits represent the associated cache set for the key. The memory controller calculates the decimal value of the middle bits (step 606).

The decimal value of the middle bits may require wrapping. Wrapping can be useful for caches with a total number of cache sets that is not constrained as a power of two. In some embodiments, the present caching system and method can offer flexibility by allowing the total number of sets to be any number, and not specifically a power of two. The present method compares the decimal value of the middle bits to the total number of sets. If the decimal value is greater than the total number of sets (step 608), the decimal value wraps around the total set number. Accordingly, the memory controller calculates the resulting set number by subtracting the total number of sets from the middle bits (step 610). The memory controller also sets a wrapped bit to 1, to indicate that the subtraction was performed in the prior step (step 612). If the decimal value is less than or equal to the total number of sets, the set number determination does not require wrapping. Accordingly, the set number is the decimal value (step 614). The memory controller also sets the wrapped bit to 0, to indicate that no subtraction was performed (step 616).

Figure 7:
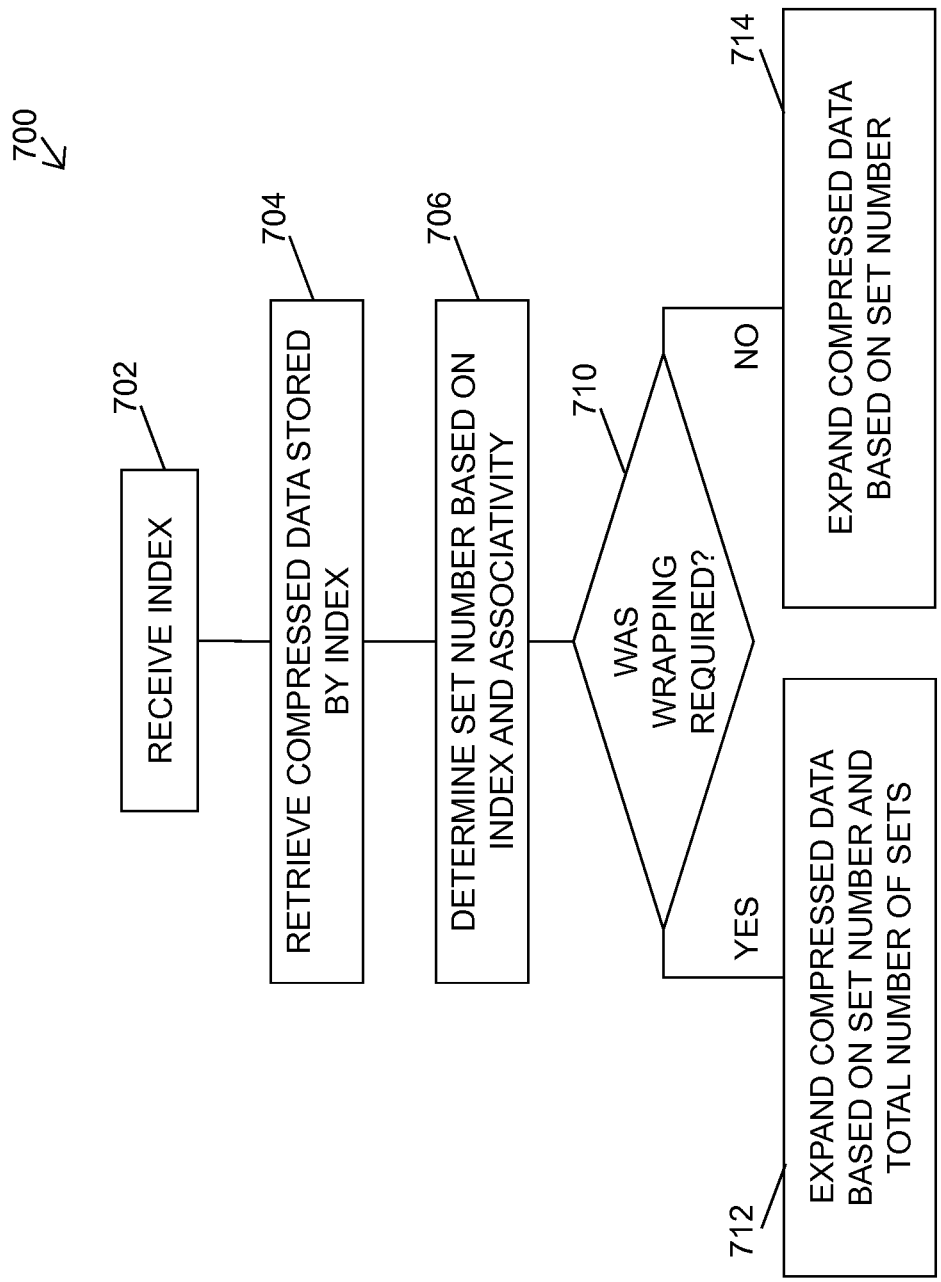
FIG. 7 illustrates a high level flow chart of a method for retrieving data from a cache in accordance with some embodiments of the present disclosure.

FIG. 7 illustrates a high level flow chart of a method 700 for retrieving data from a cache in accordance with some embodiments of the present disclosure. The memory controller receives an index (step 702). The index can be associated with a memory address of data to be retrieved from the cache. The memory controller retrieves the compressed key stored in the cache at that index (step 704).

The memory controller determines a set number for the cache set, based on the requested index and the associativity of the cache (step 706). In some embodiments, the memory controller can determine the set number using the calculation set_num=index/associativity. That is, the memory controller can divide the requested index by the associativity, and the resulting quotient determines the set number for the cache set.

The memory controller determines whether wrapping was required (step 710). In some embodiments, the memory controller determines whether wrapping was required by separating the compressed key into components. The components can include the least significant bits, the most significant bits, and the wrapped bit for the key.

If the wrapped bit indicates that wrapping was required, the memory controller expands the compressed key based on the set number and the total number of cache sets in the cache (step 712). In some embodiments, the memory controller can expand the compressed key by calculating middle_bits=set_num+total_num_sets. That is, the memory controller recreates bits in the decompressed key to represent the set number by adding the set number to the total number of cache sets if wrapping was required. This is the inverse operation to step 608 described earlier in connection with FIG. 6. The memory controller expands the key by combining the most significant bits, the middle bits as determined above, and the least significant bits.

If the wrapped bit indicates that wrapping was not required, the memory controller expands the compressed key based on the set number (step 714). The memory controller expands the key by combining the most significant bits, the set number, and the least significant bits.

The present system and method will be further described in connection with compressing multiple example keys (Examples 1-6) and decompressing an example compressed key (Example 1). The system configuration in the present examples illustrates accelerating a main memory of a 10 terabyte hard disk drive using a cache memory of a 200 gigabyte (GB) solid state device to cache frequently accessed blocks of the hard disk. The cache memory is a 512-way set associative cache with a block size of 4 kilobytes (4,096 bytes). To summarize:

SYSTEM CONFIGURATION FOR EXAMPLES 1-6

Cache size: 200 GB
Cache block size: 4,096 (4 KB)
Associativity: 512
Number of sets: 102,400
Bits to encode number of sets: 17

Here, the number of sets, 102,400, is not a power of two. Accordingly, the hash function used in the set associative cache requires $\log_2 102400 \approx 16.6$ bits to encode the set number in the key. Because the key cannot contain a fractional number of bits, the key uses 17 bits to encode the set number. That is, the set number corresponding to the set which will hold the key can be determined based on the value of 17 bits in the key. However, using 17 bits means that certain combinations of bits in the key can result in a set number that wraps around, or is larger than, the total number of sets in the cache. Accordingly, the present method tracks whether wrapping is required to determine a set number that is within the total number of sets in the cache.

The cache block size is 4,096, meaning that 4,096 keys go to each cache block. Accordingly, the last $12=\log_2 4096$ bits of the key can be the least significant bits used to encode the block size. The least significant bits can indicate an offset or location in a cache block in which the requested data can be retrieved.

Example 1

Key (disk sector number): 1000000000000 (0xe8d4a51000)
 Set Number: 84561
 Least significant bits: 0x0
 Wrapped bit: 0
 Most significant bits: 0x746
 Compressed key: 15253504 (0xe8c000)

With reference to FIG. 4, an example key to be stored in the cache memory may be 1,000,000,000,000, or in binary form, 1110100011010100101001010001000000000000. FIG. 4 illustrates this key as key 400.

As illustrated in FIG. 5, the memory controller may receive a request to compress a key. The memory controller receives the key, 1,000,000,000,000, to be stored in a cache (step 502). The key can correspond to a main memory address or disk sector number for storing the desired contents. The memory controller determines a set number for the data (step 504). As described later, the set number is determined to be 84,561, or 10100101001010001 in binary form. This set number corresponds to the middle seventeen bits of the key. The memory controller compresses the data by extracting the set number from the key (step 506). As described earlier in connection with FIG. 4, the compressed key may include least significant bits 402, bit 410 indicating whether the set number required wrapping, and most significant bits 406.

Because the compressed key does not have the set number, the compressed key requires fewer bits of storage in the cache memory (step 508). Because one bit is used to track whether wrapping has occurred, the resulting memory savings is sixteen bits, which is 17−1. Accordingly, in a cache with 102,400 cache sets, 512 blocks per set, 8 keys per block, and memory savings of 16 bits per key, the memory savings can be 6,710,886,400 bits (6,710,886,400=102,400×512×8×16).

The present system and method determine the set number, 84,561, or 10100101001010001 in binary form, as follows. As described in connection with FIG. 6, the memory controller determines a number of bits to extract from the key, based on the total number of cache sets and the block size of the cache, in this case 28 bits (step 602). In the present example, 28 bits are extracted because that is the number of bits representing the most significant bits (11 bits) and the middle bits (17 bits) shown in connection with FIG. 4. First, the memory controller calculates an intermediate value representing the most significant bits and the middle bits, where intermediate_value=key/block_size. As described above, the example key is 1,000,000,000,000 and the cache block size is 4,096. Accordingly, intermediate_value=1,000,000,000,000/4,096=244,140,625. In binary form, intermediate_value=1110100011010100101001010001. With reference to FIG. 4, this binary representation is most significant bits 406 and middle bits 404 of input key 400.

Using the binary representation of the intermediate value, the memory controller extracts the middle bits from the intermediate value (step 604). These middle bits represent the associated cache set for the key. In this example, the memory controller extracts the lowest seventeen bits of the previous result. Because the total number of cache sets in the 200 GB solid state device is 102,400, and $\log_2 102400 \approx 16.6$, seventeen bits are required for the set number. This extraction results in 10100101001010001, which corresponds to middle bits 404.

The memory controller calculates the decimal value of the middle bits (step 606). In this example, the decimal value of middle bits 10100101001010001 is 84,561. If the decimal value is less than or equal to the total number of sets, the set number is the decimal value (step 614). As described earlier, the decimal value of the middle bits for the example key is 84,561, and the total number of sets is 102,400. Because 84,561<102,400, the decimal value is less than the total number of sets. Accordingly, the resulting set number does not require wrapping and remains 84,561. The memory controller also sets the wrapped bit to 0, to track that no subtraction was performed (step 616).

After the input key has been compressed and stored, the present system can decompress the compressed key as follows. With reference to FIG. 4, the description uses compressed key 408 as an example. Compressed key 408 has binary value 111010001100000000000000, or decimal value 15,253,504.

The memory controller receives an index (step 702). The index can be associated with a memory address of data to be retrieved from the cache. For example, the memory controller receives index 101001010010100010000000000, or 43,295,232 in decimal form. The memory controller retrieves the compressed key stored in the cache at that index (step 704). According to the present example, the value stored in the cache at index 101001010010100010000000000 is the compressed key 111010001100000000000000.

The memory controller determines a set number for the cache set, based on the requested index and the associativity of the cache (step 706). In some embodiments, the memory controller uses the calculation set_num=index/associativity. That is, the resulting quotient of the calculation determines the set number for the cache set. As described earlier, the received index is 101001010010100010000000000 or 43,295,232 in decimal form. Also as described earlier, the associativity of the cache is 512. Accordingly, set_num=43,295,232/512=84,561 or 10100101001010001 in binary form.

The memory controller determines whether wrapping was required (step 710). The memory controller determines the components for the compressed key, such as the least significant bits, the most significant bits, and the wrapped bit. The memory controller separates the compressed key into components. With reference to FIG. 4, in the present example, the components for compressed key 408 are least significant bits 406 of 000000000000, wrapped bit 410 of 0, and most significant bits 402 of 11101000110.

Because the wrapped bit is 0, the wrapped bit indicates that wrapping was not required. Accordingly, the memory controller expands the compressed key based on the set number (step 714). The memory controller expands the key by combining the most significant bits, the set number, and the least significant bits. As described earlier, the components for compressed key 408 are least significant bits 406 of 000000000000, set number of 10100101001010001, and most significant bits 402 of 11101000110. Accordingly, the resulting original key is 1110100011010100101001010001000000000000, or 1,000,000,000,000 in decimal form. This result matches original key 400.

Example 2

Key (disk sector number): 1000000000
    Set Number: 10668
    Least significant bits: 0xa00
    Wrapped bit: 1
    Most significant bits: 0x1
    Compressed key: 14848 (0x3a00)

The present example illustrates compressing the key 1,000,000,000, or 001110111001101011001010000000000 in binary form. The example proceeds as described above, with one difference that the decimal value of the middle bits for the key is 113,068. The middle bits require wrapping (step 504), because the decimal value 113,068 is greater than the total number of sets, 102,400. Accordingly, the disclosed method determines the resulting set number to be 10,668, by subtracting the total number of sets from the decimal value (113,068−102,400). The disclosed method proceeds as described earlier. The last 12 bits correspond to the least significant bits, 101000000000. The wrapped bit is 1 to indicate there is wrapping. The remaining bits correspond to the most significant bits, 001. The compressed key combines the most significant bits (001), a 1 to indicate there is wrapping, and the least significant bits 101000000000, to result in a compressed key of 0011101000000000. The compressed key results in a space savings of 16 bits, from extracting the 17 bits corresponding to the set number and replacing them with 1 bit corresponding to whether there is wrapping.

Example 3

Key (disk sector number): 0 (0x0)
    Set Number: 0
    Least significant bits: 0x0
    Wrapped bit: 0
    Most significant bits: 0x0
    Compressed key: 0 (0x0)

The present example illustrates compressing the key 0. The present example proceeds as described above in connection with Example 1. The last 12 bits correspond to the least significant bits, 0. The wrapped bit is 0 to indicate there is no wrapping, because the decimal value of the middle bits, 0, is less than the total number of cache sets, 102,400. The most significant bits are also 0. The compressed key combines the most significant bits, the wrapped bit, and the least significant bit to result in a compressed key of 0 without leading zeroes. As described above, the compressed key results in a space savings of 16 bits.

Example 4

Key (disk sector number): 4096 (0x1000)
    Set Number: 1
    Least significant bits: 0x0
    Wrapped bit: 0
    Most significant bits: 0x0
    Compressed key: 0 (0x0)

The present example illustrates compressing the key 4,096, or 1000000000000 in binary form. As described earlier in connection with FIG. 3, with a block size of 4,096, the key number 4,096 corresponds to cache set 1. The present example proceeds as described above in connection with Example 1. The last 12 bits correspond to the least significant bits, 000000000000. The wrapped bit is 0 to indicate there is no wrapping, because the potential set number, 1, is less than the total number of cache sets, 102,400. The most significant bits are also 0. The compressed key combines the most significant bits (0), the wrapped bit (0), and the least significant bit (0) to result in a compressed key of 000, or 0 without leading zeroes. As described above, the compressed key results in a space savings of 16 bits.

Example 5

Key (disk sector number): 4104 (0x1008)
    Set Number: 1
    Least significant bits: 0x8
    Wrapped bit: 0
    Most significant bits: 0x0
    Compressed key: 8 (0x8)

The present example illustrates compressing the key 4,104, or 1000000001000 in binary form. The present example proceeds as described above in connection with Example 1. The last 12 bits correspond to the least significant bits, 000000001000. The wrapped bit is 0 to indicate there is no wrapping, because the potential set number, 1, is less than the total number of cache sets, 102,400. The most significant bits are also 0. The compressed key combines the most significant bits (0), the wrapped bit (0), and the least significant bit (000000001000) to result in a compressed key of 00000000001000, or 1000 without leading zeroes. As described above, the compressed key results in a space savings of 16 bits.

Example 6

Key (disk sector number): 1000000 (0xf4240)
  Set Number: 244
  Least significant bits: 0x240
  Wrapped bit: 0
  Most significant bits: 0x0
  Compressed key: 576 (0x240)

The present example illustrates compressing the key 1,000,000, or 11110100001001000000 in binary form. The present example proceeds as described above in connection with Example 1. The last 12 bits correspond to the least significant bits, 001001000000. The wrapped bit is 0 to indicate there is no wrapping, because the potential set number, 244, is less than the total number of cache sets, 102,400. The most significant bits are also 0. The compressed key combines the most significant bits (0), the wrapped bit (0), and the least significant bits (001001000000) to result in a compressed key of 00001001000000, or 1001000000 without leading zeroes. As described above, the compressed key results in a space savings of 16 bits.

Those of skill in the art would appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

Furthermore, an implementation of the present method and system can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present method can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The present disclosure has been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method for compressing data for a hash table, the method comprising:
  receiving data;
  extracting a plurality of middle bits from the data, based on a number of bits to extract;
  calculating a decimal value of the plurality of middle bits;
  when the decimal value is greater than a total number of sets:
    determining a location identifier by subtracting the total number of sets from the decimal value; and
    setting a wrapped bit to 1;
  otherwise:
    determining a location identifier as the decimal value; and
    setting the wrapped bit to 0; and
  compressing the data based on the location identifier and the wrapped bit.

2. The method of claim 1, wherein the location identifier comprises a set number.

3. The method of claim 2, further comprising determining a number of bits to extract from the data, based on (i) a block size of the hash table and (ii) the total number of sets in the hash table.

4. The method of claim 1, wherein the hash table comprises an index-to-key map for use in a cache.

5. The method of claim 1, wherein the hash table comprises an index-to-key map for use in a set associative cache.

6. The method of claim 1, further comprising retrieving target data from the hash table based on the location identifier.

7. The method of claim 6, wherein retrieving the target data comprises:
  receiving an index;
  retrieving compressed data stored at the index of the hash table;
  determining a set number based on the index and an associativity, the associativity indicating a capacity of the hash set;
  determining whether wrapping is required;
  when wrapping is required,
    expanding the compressed data based on the set number and a total number of sets in the hash table; and
  otherwise,
    expanding the compressed data based on the set number.

8. A storage device for compressing data for a hash table, the storage device comprising:
  a host interface for communicating with a host device;
  a memory for storing data;
  a memory controller comprising logic stored in a computer readable medium, the logic configured to:
    receive data;
    extract a plurality of middle bits from the data, based on a number of bits to extract;
    calculate a decimal value of the plurality of middle bits;

when the decimal value is greater than a total number of sets:
    determine a location identifier by subtracting the total number of sets from the decimal value; and
    set a wrapped bit to 1;
otherwise:
    determine a location identifier as the decimal value; and
    set the wrapped bit to 0; and
compress the data based on the location identifier and the wrapped bit.

9. The storage device of claim 8, wherein the location identifier comprises a set number.

10. The storage device of claim 9, wherein the memory controller is configured to determine a number of bits to extract from the data, based on (i) a block size of the hash table and (ii) the total number of sets in the hash table.

11. The storage device of claim 9, wherein the memory controller is further configured to retrieve target data from the hash table based on the location identifier.

12. The storage system of claim 11, wherein the memory controller is configured to:
    receive an index;
    retrieve compressed data stored at the index of the hash table;
    determine a set number based on the index and an associativity, the associativity indicating a capacity of the hash set;
    determine whether wrapping is required;
    when wrapping is required,
        expand the compressed data based on the set number and a total number of sets in the hash table; and
    otherwise,
        expand the compressed data based on the set number.

13. The storage device of claim 8, wherein the hash table comprises an index-to-key map for use in a cache.

14. The storage device of claim 8, wherein the hash table comprises an index-to-key map for use in a set associative cache.

15. A non-transitory computer program product, tangibly embodied in a computer-readable medium, the computer program product including instructions operable to cause a data processing apparatus to:
    receive data;
    extract a plurality of middle bits from the data, based on a number of bits to extract;
    calculate a decimal value of the plurality of middle bits;
    when the decimal value is greater than a total number of sets:
        determine a location identifier by subtracting the total number of sets from the decimal value; and
        set a wrapped bit to 1;
    otherwise:
        determine a location identifier as the decimal value; and
        set the wrapped bit to 0; and
    compress the data based on the location identifier and the wrapped bit.

16. The non-transitory computer program product of claim 15, wherein the location identifier comprises a set number.

17. The non-transitory computer program product of claim 16, wherein the computer program product further includes instructions operable to cause a data processing apparatus to determine a number of bits to extract from the data, based on (i) a block size of the hash table and (ii) the total number of sets in the hash table.

18. The non-transitory computer program product of claim 16, the computer program product further includes instructions operable to cause a data processing apparatus to retrieve data from the hash table based on the location identifier, the instructions operable to cause a data processing apparatus to:
    receive an index;
    retrieve compressed data stored at the index of the hash table;
    determine a set number based on the index and an associativity, the associativity indicating a capacity of the hash set;
    determine whether wrapping is required;
    if wrapping is required,
        expand the compressed data based on the set number and a total number of sets in the hash table; and
    otherwise,
        expand the compressed data based on the set number.

19. The non-transitory computer readable product of claim 16, wherein the hash table comprises an index-to-key map for use in a cache.

20. The non-transitory computer readable product of claim 16, wherein the hash table comprises an index-to-key map for use in a set associative cache.

* * * * *